US005370264A

United States Patent [19]

Wen-Chih

[11] Patent Number: 5,370,264

[45] Date of Patent: Dec. 6, 1994

[54] TICKET DISPENSER

[76] Inventor: Kung Wen-Chih, P.O. Box 82-144, Taipei, Taiwan, Prov. of China

[21] Appl. No.: 173,893

[22] Filed: Dec. 27, 1993

[51] Int. Cl.[5] .................... B65G 59/00

[52] U.S. Cl. .................... 221/259; 271/119

[58] Field of Search .................... 221/259, 217, 258, 210, 221/255, 277, 253; 271/119, 149, 109; 226/156

[56] References Cited

U.S. PATENT DOCUMENTS

| | | | |
|---|---|---|---|
| 1,562,024 | 11/1925 | Baird | 271/119 |
| 2,290,006 | 7/1942 | Trollen | 221/259 |
| 2,394,410 | 2/1946 | Tascher | 271/119 |
| 5,249,705 | 10/1993 | Gates | 221/259 |

FOREIGN PATENT DOCUMENTS

| | | | |
|---|---|---|---|
| 2251509 | 7/1992 | United Kingdom | 221/259 |

*Primary Examiner*—Kenneth W. Noland
*Attorney, Agent, or Firm*—Alfred Lei

[57] ABSTRACT

A ticket dispenser including a frame including a pair of side panels and a front panel having a slot, a driven roller fitted between the side panels, a driving roller disposed under the driven roller, a ticket rail extending slantwise between the driven roller and the driving roller, a worm gear fixedly connected with an end of the driving roller, a worm rod engaged with the worm gear, and a motor drivingly connected with the worm rod, whereby the dispenser is durable in use and easy to maintain.

1 Claim, 3 Drawing Sheets

TICKET DISPENSER

BACKGROUND OF THE INVENTION

It has been found that the conventional ticket dispenser is complicated in structure and generally composed of a motor, a reduction gear, a belt, two pulleys, a transmission axle, springs, and a number of gears. Hence, such a ticket dispenser is difficult to maintain and expensive in cost thereby making it infeasible for practical use.

Therefore, it is an object of the present invention to provide an improved ticket dispenser which may obviate and mitigate the above-mentioned drawbacks.

SUMMARY OF THE INVENTION

This invention relates to an improved ticket dispenser.

It is the primary object of the present invention to provide a ticket dispenser which may prevent the ticket from being pulled out when the motor is turned off.

It is another object of the present invention to provide a ticket dispenser which is durable in use.

It is still another object of the present invention to provide a ticket dispenser which is easy to replace ticket.

It is still another object of the present invention to provide a ticket dispenser which is facile to maintain.

It is a further object of the present invention to provide a ticket dispenser which is economic to produce.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
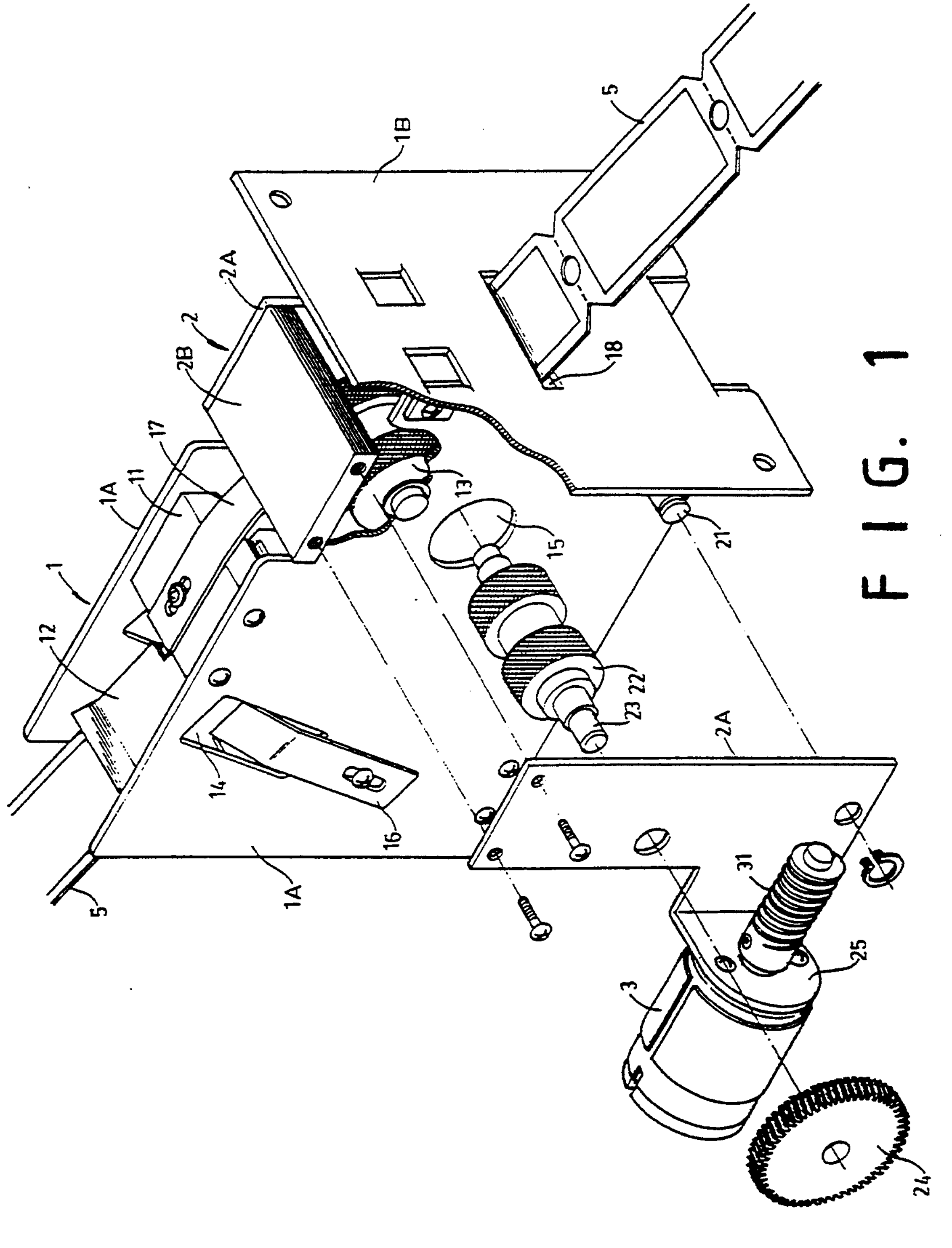
FIG. 1 is an exploded view of a ticket dispenser according to the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the ticket dispenser according to the present invention mainly comprises a frame 1, a U-shaped member 2, and a motor 3.

Figure 3:
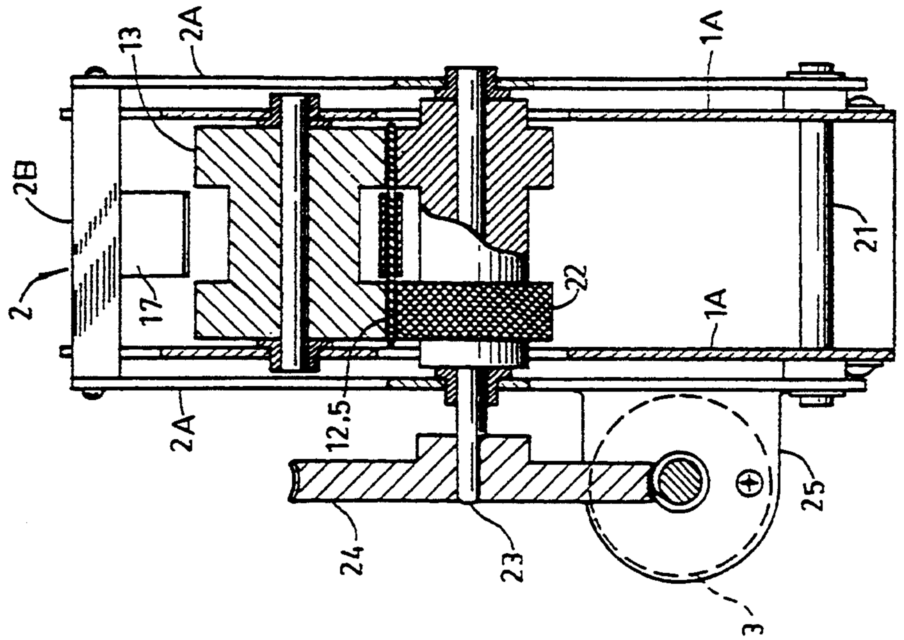
FIG. 3 is a sectional side view of the ticket dispenser.
Figure 2:
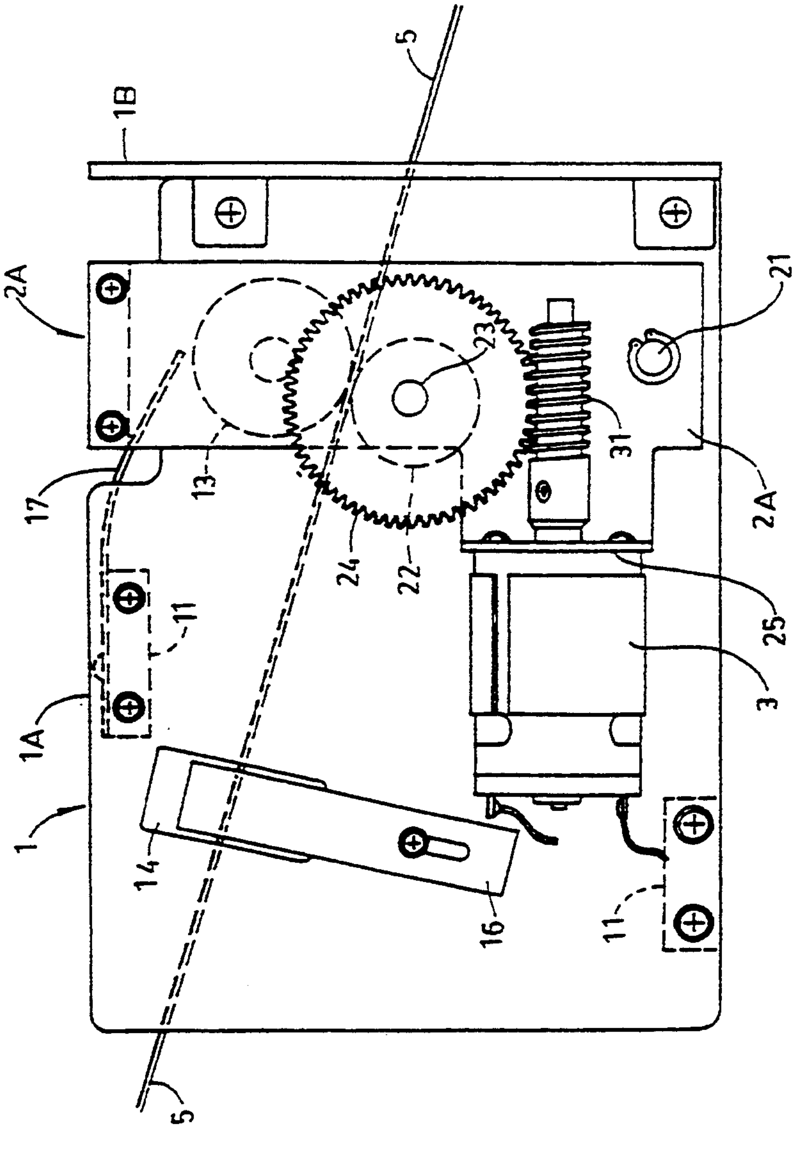
FIG. 2 shows the interior of the ticket dispenser.

As shown in FIGS. 2 and 3, the frame 1 includes a pair of side panels 1A and a front panel 1B. The side panels 1A are spaced apart by an upper packing block 11 and a lower packing block 11. An inclined ticket rail 12 is mounted between the side panels 1A. Above the inclined ticket rail 12 there is a driven roller 13 formed with knurling on its surface. Each side panel 1A is formed with a rectangular hole 14 and a circular hole 15. In each rectangular hole 14 is fitted a resilient member 16 so that the ticket rail 12 is kept between two resilient members 16. On the upper packing block 11 is mounted a leaf spring 17 which inclines slightly downwardly and is located above the driven roller 13. The front panel 1B is disposed vertically to the side panels 1A and is formed with a slot 18 for the passage of the ticket 5.

The U-shaped member 2 including two vertical plates 2A and a horizontal plate 2B mounted on the top of the two vertical plates 2A is pivotally mounted on the lower portion of the side panels 1A of the frame 1 by an axle 21 so that the U-shaped member 2 can be rotated with respect to the axle 21. A driving roller 22 is mounted under and in contact with the driven roller 13 and is formed with knurling on its surface. The driving roller 22 has an end 23 extending out of the vertical plate 2A of the U-shaped member 2 to fixedly connect with a worm gear 24. The worm gear 24 is engaged with a worm rod 31 which is in turn connected with the motor 3. The motor 3 is arranged on a wing 25 of the vertical plate 2A of the U-shaped member 2.

Figure 4:
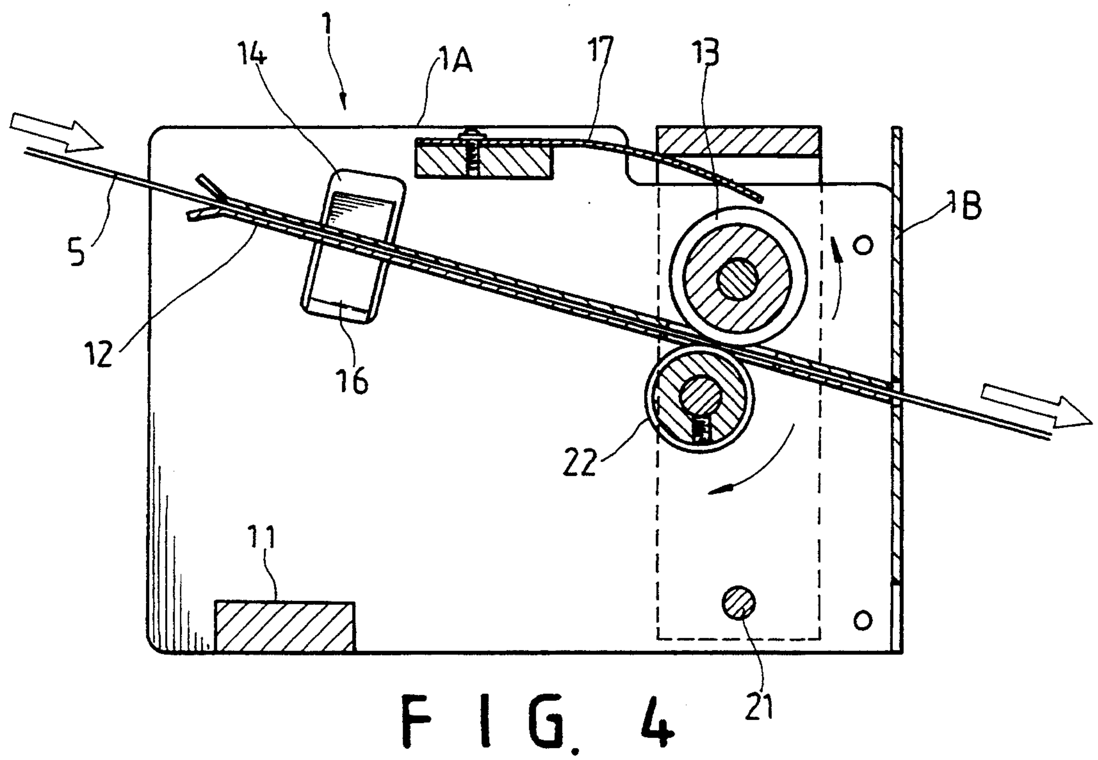
FIGS. 4 and 5 show the working principle of the present invention.
Figure 5:
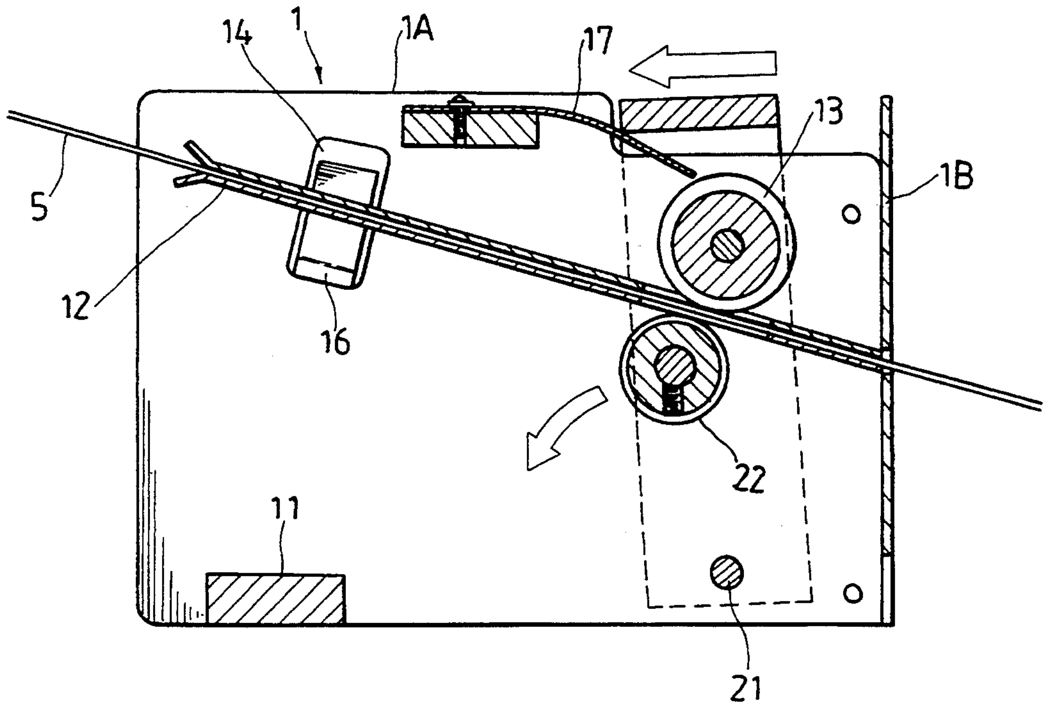

As the motor 3 is turned on, the motor 3 will rotate the worm rod 31 which will in turn drive the worm gear 24. Then, the worm gear 24 will rotate the driving roller 22 which will, in association with the driven roller 13, pull the ticket 5 in the ticket rail 12 to go downwardly out of the slot 18 of the front panel 1B (see FIGS. 4 and 5).

When the motor 3 is turned off, the worm gear 24 will be stopped and the ticket 5 will be no longer pulled out of the slot 18 of the front panel 1B. Further, as the worm gear 24 cannot be rotated in reverse direction and the driven roller 13 is forced by the leaf spring 17 to contact the driving roller 22, it will be impossible to pull the ticket 5 out of the slot 18 of the front panel 1B without turning on the motor 3 thereby preventing the ticket from be stolen.

When required to replace the ticket 5, simply push the U-shaped member 2 to the left (with respect to FIG. 5) to disengage the driven roller 13 from the driving roller 22 hence making it easy to replace the ticket 5.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A ticket dispenser comprising:

a frame including a pair of side panels and a front panel, said side panels being spaced apart by an upper packing block and a lower packing block, said front panel being disposed vertically to said side panels and formed with a slot for passage of a ticket;

a driven roller fitted between said side panels and formed with knurling thereon;

a driving roller disposed under said driven roller and formed with knurling thereon;

a ticket rail extending slatwise between said driven roller and said driving roller;

said side panels being each formed with a rectangular hole in which is fitted a resilient member so as to keep said ticket rail in a fixed position;

a leaf spring mounted on said upper packing block and inclining downwardly on said driven roller;

a worm gear fixedly connected with an end of said driving roller;

a worm rod engaged with said worm gear; and a motor drivingly connected with said worm rod.

* * * * *